No. 765,999.

Patented July 26, 1904.

UNITED STATES PATENT OFFICE.

WILLIAM H. SIMPSON, OF PEORIA, ILLINOIS.

SMOKELESS GUNPOWDER AND METHOD OF MAKING SAME.

SPECIFICATION forming part of Letters Patent No. 765,999, dated July 26, 1904.

Application filed March 23, 1904. Serial No. 199,576. (No specimens.)

*To all whom it may concern:*

Be it known that I, WILLIAM H. SIMPSON, a citizen of the United States, residing at Peoria, in the county of Peoria and State of Illinois, have invented a new and useful Improvement in Smokeless Gunpowder and Method of Producing the Same, of which the following is a specification.

The combination of ingredients employed in this invention are such as to materially cheapen the production of smokeless gunpowder and improve the same by increasing its explosive quality and the quickness of its action.

The composition comprising my invention consists of the following ingredients combined in the proportions stated, namely: chlorate of potash, thirty-seven parts; yellow prussiate of potash, twenty-five parts; a saturated solution of flowers of sulfur and ether, eight parts; a saturated solution of tannic acid and Columbian spirits, thirty parts.

The above-named ingredients are mixed to form the compound as follows: Thoroughly mix dry thirty-seven parts of chlorate of potash and twenty-five parts of yellow prussiate of potash, and after the same are thoroughly mixed add sufficient water to form a dough-like mixture. Then add thereto eight parts of flowers of sulfur after the same has been treated with sufficient ether to make a thoroughly-saturated solution. Then add thirty parts of tannic acid after the same has been treated with sufficient Columbian spirits to make a thoroughly-saturated solution and mix the compound thoroughly. The compound after being thus mixed is then forced through a sieve of such mesh as will produce the desired size of grain of powder. After graining the compound the same may be thoroughly dried, when it is ready for use.

This invention constitutes quite an improvement over other forms of gunpowder containing chlorate of potash and yellow prussiate of potash, for the reason that the compound above described will produce practically no smoke. Moreover, the addition of the eight parts of flowers of sulfur treated with ether and thirty parts of tannic acid treated with Columbian spirits, as described, permits the use of a greater proportion of tannic acid, with the result that a stronger and quicker powder is produced at a great reduction in the cost of manufacture.

What I claim, and desire to secure by Letters Patent of the United States, is—

1. The herein-described composition of matter consisting of chlorate of potash, yellow prussiate of potash, flowers of sulfur, and tannic acid, substantially as described.

2. The herein-described composition of matter consisting of the following ingredients, namely, chlorate of potash, thirty-seven parts; yellow prussiate of potash, twenty-five parts; saturated solution of flowers of sulfur, eight parts, and a saturated solution of tannic acid, thirty parts, substantially as described.

3. The method of producing smokeless gunpowder, which consists in mixing dry thirty-seven parts of chlorate of potash and twenty-five parts of yellow prussiate of potash, adding to this mixture sufficient water to form a dough-like mixture, adding to this dough-like mixture eight parts of flowers of sulfur treated with ether to form a saturated solution, adding to this thirty parts of tannic acid treated with sufficient Columbian spirits to form a saturated solution, thoroughly mixing the compound thus formed and drying the same.

4. The method of producing smokeless gunpowder, which consists in mixing dry thirty-seven parts of chlorate of potash and twenty-five parts of yellow prussiate of potash, adding to this mixture sufficient water to form a dough-like mixture, adding to this dough-like mixture eight parts of flowers of sulfur treated with ether to form a saturated solution, adding to this thirty parts of tannic acid treated with sufficient Columbian spirits to form a saturated solution, thoroughly mixing the compound thus formed, separating the compound into masses of the desired size to form the grains, and drying the same, substantially as described.

In testimony whereof I have signed my name to this specification in the presence of two subscribing witnesses.

WILLIAM H. SIMPSON.

In presence of—
 WESLEY LAWRENCE,
 W. W. WHITMORE.